US010751801B2

(12) United States Patent
Feigelson et al.

(10) Patent No.: US 10,751,801 B2
(45) Date of Patent: Aug. 25, 2020

(54) BULK MONOLITHIC NANO-HETEROSTRUCTURES AND METHOD OF MAKING THE SAME

(71) Applicants: Boris N. Feigelson, Springfield, VA (US); James A. Wollmershauser, Hyattsville, MD (US)

(72) Inventors: Boris N. Feigelson, Springfield, VA (US); James A. Wollmershauser, Hyattsville, MD (US)

(73) Assignee: The Government of the United States of America, as represented by the Secretary of the Navy, Washington, DC (US)

( * ) Notice: Subject to any disclaimer, the term of this patent is extended or adjusted under 35 U.S.C. 154(b) by 727 days.

(21) Appl. No.: 14/541,188

(22) Filed: Nov. 14, 2014

(65) Prior Publication Data
US 2015/0147590 A1    May 28, 2015

Related U.S. Application Data

(60) Provisional application No. 61/907,440, filed on Nov. 22, 2013.

(51) Int. Cl.
*B22F 3/12* (2006.01)
*C04B 35/645* (2006.01)
(Continued)

(52) U.S. Cl.
CPC .............. *B22F 3/12* (2013.01); *B22F 1/0085* (2013.01); *C04B 35/443* (2013.01);
(Continued)

(58) Field of Classification Search
CPC .... B22F 1/0018; B22F 1/0022; B22F 1/0025; B22F 1/0044; B22F 1/0081; B22F 1/0085;
(Continued)

(56) References Cited

U.S. PATENT DOCUMENTS

| 5,147,446 A | * | 9/1992 | Pechenik | .............. | C04B 35/584 |
| | | | | | 264/109 |
| 5,984,996 A | * | 11/1999 | Gonsalves | ............ | B22F 1/0018 |
| | | | | | 501/87 |

(Continued)

OTHER PUBLICATIONS

R.P. Goehner and M.C. Nichols, X-Ray Powder Diffraction, Introduction and Instrumentation, Materials Characterization, vol. 10, ASM Handbook, ASM International, 1986, pp. 333-343 (print), 12 pages (online).*

(Continued)

*Primary Examiner* — Vanessa T. Luk
(74) *Attorney, Agent, or Firm* — US Naval Research Laboratory; Joslyn Barritt

(57) ABSTRACT

A new Enhanced High Pressure Sintering (EHPS) method for making three-dimensional fully dense nanostructures and nano-heterostructures formed from nanoparticle powders, and three-dimensional fully dense nanostructures and nano-heterostructures formed using that method. A nanoparticle powder is placed into a reaction chamber and is treated at an elevated temperature under a gas flow to produce a cleaned powder. The cleaned powder is formed into a low density green compact which is then sintered at a temperature below conventional sintering temperatures to produce a fully dense bulk material having a retained nanostructure or nano-heterostructure corresponding to the nanostructure of the constituent nanoparticles. All steps are performed without exposing the nanoparticle powder to the ambient.

20 Claims, 8 Drawing Sheets

(51) Int. Cl.
  *C04B 35/628* (2006.01)
  *B22F 1/00* (2006.01)
  *C04B 35/443* (2006.01)
(52) U.S. Cl.
  CPC .......... *C04B 35/628* (2013.01); *C04B 35/645* (2013.01); *B22F 2998/10* (2013.01); *C04B 2235/3222* (2013.01); *C04B 2235/549* (2013.01); *C04B 2235/5436* (2013.01); *C04B 2235/5454* (2013.01); *C04B 2235/608* (2013.01); *C04B 2235/6567* (2013.01); *C04B 2235/6582* (2013.01); *C04B 2235/6585* (2013.01); *C04B 2235/781* (2013.01); *C22C 2202/02* (2013.01); *Y10T 428/12937* (2015.01)
(58) Field of Classification Search
  CPC .... B22F 1/02; B22F 1/025; B22F 2001/0029; B22F 2001/0033; B22F 2001/0037; B22F 2998/00; B22F 2998/10; B22F 2999/00
  See application file for complete search history.

(56) References Cited

U.S. PATENT DOCUMENTS

| | | | | |
|---|---|---|---|---|
| 6,395,214 | B1* | 5/2002 | Kear | C04B 35/111 264/125 |
| 6,720,074 | B2* | 4/2004 | Zhang | B22F 1/0018 427/127 |
| 7,241,328 | B2* | 7/2007 | Keener | B22F 1/0018 148/577 |
| 8,227,372 | B2* | 7/2012 | Lopez | B22F 1/0018 29/890 |
| 2002/0025272 | A1* | 2/2002 | Witherspoon | B22F 3/087 419/66 |
| 2005/0223848 | A1* | 10/2005 | Ueno | C22C 1/0433 75/351 |
| 2006/0053969 | A1* | 3/2006 | Harada | H01L 35/34 75/255 |
| 2006/0100088 | A1* | 5/2006 | Loureiro | C04B 35/44 501/152 |
| 2006/0153728 | A1* | 7/2006 | Schoenung | B22F 9/04 419/32 |
| 2009/0224434 | A1* | 9/2009 | Anselmi-Tamburini | B82Y 30/00 264/430 |
| 2010/0295202 | A1* | 11/2010 | Tian | B22F 3/16 264/101 |
| 2011/0057756 | A1* | 3/2011 | Marinescu | B22F 1/007 335/302 |
| 2011/0108778 | A1* | 5/2011 | Ren | B82Y 30/00 252/521.1 |

OTHER PUBLICATIONS

T. C. Lu, X. H. Chang, J. Q. Qi, X. J. Luo, Q. M. Wei, S. Zhu, K. Sun, J. Lian, L. M. Wang, "Low-temperature high-pressure preparation of transparent nanocrystalline MgAl2O4 ceramics," Applied Physics Letters, 88, 213120, 2006. (Year: 2006).*
Jie Zhang, Tiecheng Lu, Xianghui Chang, Nian Wei, Wen Xu, "Related mechanism of transparency in MgAl2O4 nano-ceramics prepared by sintering under high pressure and low temperature," Journal of Physics D: Applied Physics, 42, 052002, 2009. (Year: 2009).*
R.Z. Valiev, R.K. Islamgaliev, and I.V. Alexandrov, "Bulk nanostructured materials from severe plastic deformation," Progress in Materials Science (2000) 45, pp. 103-189.
A. Manaf, R.A. Buckley, and H.A. Davies, "New Nanocrystalline High-remanence Nd—Fe—B Alloys by Rapid Solidification," Journal of Magnetism and Magnetic Materials (1993) 128, pp. 302-306.
L.Q. Xing, J. Eckert, W. Loser, and L. Schultz, "High-strength materials produced by precipitation of icosahedral quasicrystals in bulk Zr—Ti—Cu—Ni—Al amorphous alloys," Applied Physics Letters (1999) 74, pp. 664-666.
C.B. Murray, S.H. Sun, W. Gaschler, H. Doyle, T.A. Betley, and C.R. Kagan, "Colloidal synthesis of nanocrystals and nanocrystal superlattices," IBM Journal of Research and Development (2001) 45, pp. 47-56.
F. Maglia, I.G. Tredici, and U. Anselme-Tamburini, "Densification and properties of bulk nanocrystalline functional ceramics with grain size below 50 nm," Journal of the European Ceramic Society (2013) 33 pp. 1045-1066.
J.E. Carsley, A. Fisher, W.W. Milligan, and E.C. Aifantis, "Mechanical behavior of a bulk nanostructured iron alloy," Metallurgical and Materials Transactions A (1998) 29, pp. 2261-2271.
Z. Zhang, F. Zhou, and E.J. Lavernia, "On the analysis of grain size in bulk nanocrystalline materials via X-ray diffraction," Metallurgical and Materials Transactions A (2003) 34A, pp. 1349-1355.
M.J. Mayo, "Processing of nanocrystalline ceramics from ultrafine particles," International Materials Reviews (1996) 41, pp. 85-115.
B. Poudel, Q. Hao, Y. Ma, Y.C. Lan, A. Minnich, B. Yu, X.A. Yan, D.Z. Wang, A. Muto, D. Vashaee, X.Y. Chen, J.M. Liu, M.S. Dresselhaus, G. Chen, and Z.F. Ren, "High-thermoelectric performance of nanostructured bismuth antimony telluride bulk alloys," Science (2008) 320, pp. 634-638.
R. Chaim, Z.Y. Shen, and M. Nygren, "Transparent nanocrystalline MgO by rapid and low-temperature spark plasma sintering," Journal of Materials Research (2004) 19, pp. 2527-2531.
S. Paris, E. Gaffet, F. Bernard, and Z.A. Munir, "Spark plasma synthesis from mechanically activated powders: a versatile route for producing dense nanostructured iron aluminides," Scripta Materialia (2004) 50, pp. 691-696.
I.-W. Chen and X.-H. Wang, "Sintering dense nanocrystalline ceramics without final stage grain growth," Nature (2000) 404, pp. 168-171.
S.-C. Liao, Y.-J. Chen, B.H. Kear, and W.E. Mayo, "High pressure/low temperature sintering of nanocrystalline alumina," Nanostructured Materials (1998) 10, pp. 1062-1079.
R. Castro and K. van Bentham, Sintering: Mechanisms of Convention Nanodensification and Field Assisted Processes (2012) vol. 35, pp. 204-205.
David Ehre et al., "Abnormal Hall-Petch behavior in nanocrystalline MgO ceramic," J. Mater. Sci. (2008) 43:6139-6143.
Yuejian Wang, et al., "Strength Weakening by Nanocrystals in Ceramic Materials," Nano Lett., 2007, 7 (10), pp. 3196-3199.
Dae-Won Kim et al., "Molecular Dynamic Simulation in Titanium Dioxide Polymorphs: Rutile, Brookite, and Anatase," J. Am. Ceram. Soc. 79 [4], 1095-99 (2006).
Dorian A. H. Hanaor, et al., "Review of the anatase to rutile phase transformation," J. Matter. Sci. (2011) 46:855-874.
William D. Callister, Jr., Materials Science and Engineering: An Introduction, John Wiley & Sons, Inc. (2007), at pp. 46 and 255.

* cited by examiner

BULK MONOLITHIC NANO-HETEROSTRUCTURES AND METHOD OF MAKING THE SAME

CROSS-REFERENCE

This application is a Nonprovisional of, and claims the benefit of priority under 35 U.S.C. § 119 based on, U.S. Provisional Patent Application No. 61/907,440 filed on Nov. 22, 2013, the entirety of which is hereby incorporated by reference into the present application.

TECHNICAL FIELD

The present invention relates to methods for making bulk monolithic solids having desired complex nano-scaled microstructures and desired properties.

BACKGROUND

Nano-scaled microstructures incorporated into bulk monolithic polycrystalline solids such as metals, insulators, and semiconductors provide engineering access to unique and often exceptional physical properties primarily utilized in thin-films or other similarly limited nanoscale geometries. Functional properties that can be improved by the presence of nano-scale microstructures of bulk materials include, but are not limited to, strength, hardness, magnetization, thermal resistance, quantum tunneling, and optical transmission.

In general, these properties are improved or unveiled as the nanostructure of the material is refined. Bulk materials having improved or new properties from nano-scale microstructures can be used in numerous applications, including optical and detector devices, cathodes, high strength oxide and metals, nanocomposite magnets, superconductors, and thermoelectrics.

Currently, bulk monolithic polycrystalline solids which have nano-scale elements in their microstructure are produced by a variety of processing approaches. These approaches include severe plastic deformation, solid state nano-precipitation, rapid solidification, consolidation/organization of colloidal crystals, sintering (including spark plasma sintering, hot pressing, hot isostatic pressing). See R. Z. Valiev, R. K. Islamgaliev, and I. V. Alexandrov, "Bulk nanostructured materials from severe plastic deformation," *Progress in Materials Science* (2000) 45, pp. 103-189; A. Manaf, R. A. Buckley, and H. A. Davies, "New Nanocrystalline High-remanence Nd—Fe—B Alloys by Rapid Solidification," *Journal of Magnetism and Magnetic Materials* (1993) 128, pp. 302-306; L. Q. Xing, J. Eckert, W. Loser, and L. Schultz, "High-strength materials produced by precipitation of icosahedral quasicrystals in bulk Zr—Ti—Cu—Ni—Al amorphous alloys," *Applied Physics Letters* (1999) 74, pp. 664-666; C. B. Murray, S. H. Sun, W. Gaschler, H. Doyle, T. A. Betley, and C. R. Kagan, "Colloidal synthesis of nanocrystals and nanocrystal superlattices," *IBM Journal of Research and Development* (2001) 45, pp. 47-56; F. Maglia, I. G. Tredici, and U. Anselme-Tamburini, "Densification and properties of bulk nanocrystalline functional ceramics with grain size below 50 nm," *Journal of the European Ceramic Society* (2013) 33 pp. 1045-1066; J. E. Carsley, A. Fisher, W. W. Milligan, and E. C. Aifantis, "Mechanical behavior of a bulk nanostructured iron alloy," *Metallurgical And Materials Transactions A* (1998) 29, pp. 2261-2271; Z. Zhang, F. Zhou, and E. J. Lavernia, "On the analysis of grain size in bulk nanocrystalline materials via X-ray diffraction," *Metallurgical And Materials Transactions A* (2003) 34A, pp. 1349-1355; M. J. Mayo, "Processing of nanocrystalline ceramics from ultrafine particles," *International Materials Reviews* (1996) 41, pp. 85-115; B. Poudel, Q. Hao, Y. Ma, Y. C. Lan, A. Minnich, B. Yu, X. A. Yan, D. Z. Wang, A. Muto, D. Vashaee, X. Y. Chen, J. M. Liu, M. S. Dresselhaus, G. Chen, and Z. F. Ren, "High-thermoelectric performance of nanostructured bismuth antimony telluride bulk alloys," *Science* (2008) 320, pp. 634-638; R. Chaim, Z. Y. Shen, and M. Nygren, "Transparent nanocrystalline MgO by rapid and low-temperature spark plasma sintering," *Journal of Materials Research* (2004) 19, pp. 2527-2531; and S. Paris, E. Gaffet, F. Bernard, and Z. A. Munir, "Spark plasma synthesis from mechanically activated powders: a versatile route for producing dense nanostructured iron aluminides," *Scripta Materialia* (2004) 50, pp. 691-696.

However, each of these known processing approaches has significant drawbacks. Some are limited to a narrow class of materials and narrow design of nanostructure. Other approaches retain porosity in the bulk material or incorporate foreign substances in the bulk material, while others dramatically change the length scale of the nanostructure or are limited in the achievable geometry of the fabricated material.

Severe plastic deformation involves using large strains and complex stress states to produce a material with a high defect density and an ultrafine or, for some materials, nanocrystalline grain structure. Because of the use of large strains the processing approach is most often limited to single phase metals and alloys. Additionally, nanocrystalline microstructures cannot be obtained in all metal materials and when achievable, the length scale is >50 nanometers. See Valiev, supra.

Solid state precipitation produces a multi-phase nanostructure by forming and growing a new phase within a parent phase to the size of nanoscale precipitates which are homogeneously distributed inside the parent phase. This is most often achieved by increasing the temperature of the material to a temperature where the second phase is stable to form nuclei of new phase, and then relatively fast cooling rates are used to stop growth the new phase and retain the nanostructure. Such a processing approach is limited to narrow range of material systems because it requires solubility of one material in another. Additionally, forming microstructures comprised primary of nanostructures is not possible in all systems because the size of the precipitate is fundamentally controlled by intrinsic diffusion rates and kinetics and modifications to processing parameters, such as cooling rate or anneal temperature (if system is super cooled), may not allow sufficient microstructural control. See Xing, supra.

Rapid solidification forms nano-crystalline and nano-quasicrystalline materials (mixture with amorphous or larger grain material) from very fast cooling of liquid. The microstructure length scale is determined by the nucleation and growth kinetics during the short timescale of the solidification process. Generally, cooling rates on the order of ~100,000 K/s can result in microstructures with length scales less than 1 micrometer. By increasing the solidification rate finer microstructure is obtained. However, the required fast cooling to produce nanocrystalline materials is most often only achievable when forming thin ribbon form factors. Therefore, bulk three-dimensional materials, such as those used in structural applications, are not possible. See Manaf, supra.

Colloidal crystals are ordered arrays of colloid particles, and when comprised of nano-sized colloid particles can be classified as a bulk nanomaterial. In general, the colloid particles can range in size from a few nanometers to micrometers and can be created from solution precipitation as single phase or multi-phase core-shell structures. The bulk properties of a colloidal crystal depend on the composition and size of the colloidal particle, as well as their arrangement/packing and degree of long range order. However, colloidal particles often have organic ligand and, therefore, the properties of colloidal crystal are also governed by these impurities, or if removed, porosity between the colloidal particles. See Murray, supra.

Sintering is a process of forming bulk materials from powder precursors through the application of heat and/or pressure. The process can be used with metals, ceramics, plastics, semiconductors, and other materials. Known sintering techniques include pressureless sintering, hot pressing, hot isostatic pressing, spark plasma sintering, and high pressure sintering. Powder precursors can range in size from nanometers to micrometers and can be single phase, two phase mixtures, or complex powder structures/mixtures. See Maglia, supra; Mayo, supra; and Poudel, supra; see also I.-W. Chen and X.-H. Wang, "Sintering dense nanocrystalline ceramics without final-stage grain growth," *Nature* (2000) 404, pp. 168-171.

However, when starting from nanostructured powders, hot pressing and hot isostatic pressing form materials with non-nanoscale microstructures having a size greater than 100 nm. On the other hand, shorter sintering times or lower temperatures can be used to retain the nanostructure, but in such cases residual porosity remains. Additionally, binders and/or sintering aids are often used in hard to sinter materials and result in residual impurities or changes in the chemistry/stoichiometry at particle boundaries. See Carsley, supra; see also Zhang, supra.

Spark-plasma sintering can be used to retain nanostructures in bulk form, but, presently, the nanostructure size is limited to greater than 60-70 nanometers. See Chaim, supra; see also Paris, supra.

High pressure (2 GPa-8 GPa) sintering has recently been used to form nanocrystalline materials from nanopowder. However, residual porosity and impurity content remain in the final product as a result of incomplete powder processing techniques and/or exposure to contamination after powder processing. These process artifacts ultimately influence the properties of the bulk nanostructured material. See S.-C. Liao, Y.-J. Chen, B. H. Kear, and W. E. Mayo, "High pressure/low temperature sintering of nanocrystalline alumina," *Nanostructured Materials* (1998) 10, pp. 1062-1079.

Thus, bulk nanostructured materials with nanostructures having a size of less than 50 nanometers and no residual porosity or impurity content have not presently been demonstrated with current sintering techniques. See Maglia, supra; see also R. Castro and K. van Bentham, *Sintering: Mechanisms Of Convention Nanodensification And Field Assisted Processes* (2012) Vol. 35, pp. 204-205.

Therefore, there is a need for a single process that can be used with arbitrary material systems, including metals, insulators, and semiconductor and that is capable of producing bulk monolithic polycrystalline materials with nano-scale microstructures comprising nanostructures and nano-heterostructures having a size of 50 nanometers or smaller.

SUMMARY

This summary is intended to introduce, in simplified form, a selection of concepts that are further described in the Detailed Description. This summary is not intended to identify key or essential features of the claimed subject matter, nor is it intended to be used as an aid in determining the scope of the claimed subject matter. Instead, it is merely presented as a brief overview of the subject matter described and claimed herein.

The present invention provides a new Enhanced High Pressure Sintering (EHPS) method for making three-dimensional fully dense nanostructures and nano-heterostructures formed from nanoparticle powders, and further provides three-dimensional fully dense nanostructures and nano-heterostructures formed using that method.

In accordance with the present invention, a nanoparticle powder is placed into a reaction chamber and is treated at an elevated predetermined temperature under a flow of a predetermined gas to remove contaminants and adsorbants from the surface of the particles to produce a powder consisting of nanoparticles having a pristine surface and highest chemical potential. The cleaned powder is formed into a low density pre-shaped, or "green," compact without exposure to the ambient. The green compact is then placed in a high-pressure device without exposure to the ambient and is sintered at a temperature below conventional sintering temperatures to produce a fully dense bulk material having a retained nanostructure or nano-heterostructure corresponding to the nanostructure of the constituent nanoparticles.

In some embodiments, the starting material can consist of a single material with all particles having the same particle size or different particle size, while in other embodiments it can be a mixture of materials having the same or different particle sizes.

In some embodiments, the cleaned powder is placed in a powder Atomic Layer Deposition (p-ALD) reactor without exposure to the ambient before being formed into the green compact to make p-ALD core/shell or core/multi-shell particles that are then formed into the green compact and sintered to produce the bulk material.

In still other embodiments, the starting material can include core/shell or core/multi-shell particles of the same or different materials and sizes.

In all embodiments, once the powder is placed into the reaction chamber, it is not exposed to the ambient air at any time until the processing is complete and the bulk monolithic material is produced.

The method of the present invention can be used to produce three-dimensional fully dense nanostructures and/or nano-heterostructures from starting materials comprising nanoparticles, core/shell and/or core/multi-shell nanoparticles, where the starting materials are all the same material or are different materials, and can be used to form three-dimensional fully dense nano-hetero structures of metals, semiconductors, insulators, and combinations thereof.

DETAILED DESCRIPTION

Figure 1:
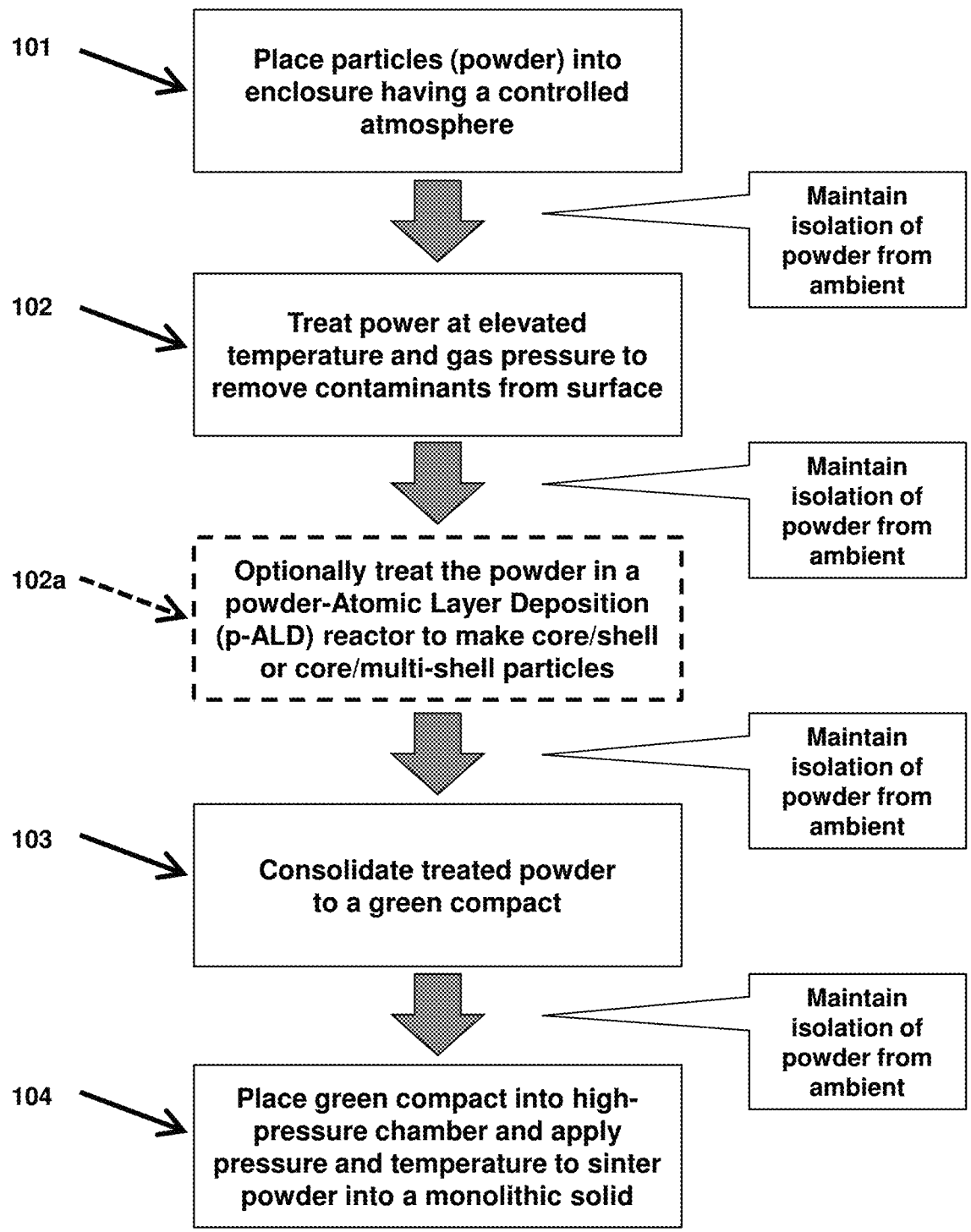
FIG. 1 is a flow diagram illustrating an exemplary process flow for a method for producing bulk monolithic polycrystalline nanostructured microstructures in accordance with the present invention.

The aspects and features of the present invention summarized above can be embodied in various forms. The following description shows, by way of illustration, combinations and configurations in which the aspects and features can be put into practice. It is understood that the described aspects, features, and/or embodiments are merely examples, and that one skilled in the art may utilize other aspects, features, and/or embodiments or make structural and functional modifications without departing from the scope of the present disclosure.

The present invention provides a method for making three-dimensional fully dense nanostructures and nano-heterostructures formed from a plurality of different materials and three-dimensional fully dense nanostructures and nano-heterostructures formed using that method.

More specifically, the present invention provides a method for making three-dimensional fully dense nanostructures and nano-heterostructures by consolidating nanoparticles, core/shell and/or core/multi-shell nanoparticles comprising different materials.

The method of the present invention can be used to form three-dimensional fully dense nanostructures and nano-heterostructures of metals, semiconductors, insulators, and combinations thereof.

These and other aspects of this invention can be accomplished by the new Enhanced High Pressure Sintering (EHPS) method described in details in the disclosure of this invention.

One of the main goals of this invention is to provide a process which allows the sintering of nanoparticles of different materials without using any binders or sintering activators, which can change the properties of the final material, to produce a monolithic (i.e., fully dense) solid bulk material that retains the nanostructure of the initial nanoparticles.

Sintering provides a universal approach to make bulk nanostructures of ceramics, semiconductors, and metals. However, traditional sintering-based techniques, including pressureless sintering, Spark Plasma Sintering, microwave sintering, and high pressure sintering, have not been successful in producing fully dense bulk materials having grain sizes of less than 50 nm.

The present invention is based on the idea that sintering of nanopowders to fully dense materials with retained nanostructures (i.e., grain sizes) smaller than 50 nm can be achieved as the result of the synergy of multiple phenomena, including (1) the effects related to the high surface area/curvature of nanoparticles combined with proper surface termination resulting in the highest chemical potential, (2) the application of sufficiently high external pressures, and (3) sintering at temperatures below the traditional sintering temperature of about seven-tenths of the melting temperature (0.7 Tm) of the material.

The highest surface sintering activity of nanoparticles is possible only when the nanoparticles are free from surface contaminants. Such surface activity promotes surface energy-driven diffusional processes that lead to the initiation of sintering at temperatures of 0.2-0.4 Tm, primarily via necking between nanoparticles.

External high pressures serve (1) to place the nanoparticles in very close proximity to one another and (2) to create ultra-high contact pressures between nanoparticles, promoting interdiffusion and sintering. Application of ultra-high contact pressures on small contact areas between particles drive up stresses at the particle interfaces and further enhance bulk transport processes that alleviate localized stresses by densifying the powders without coarsening of the grain size. Such ultra-high contact pressures also cause plastic deformation at the interfaces between nanoparticles and plastic flow regardless of the nature of nanoparticles, leading to sufficient densification and potentially providing additional diffusional pathways (dislocation pipe diffusion) that promote bulk diffusion over surface diffusion related to coarsening.

Sintering at temperatures below 0.7 Tm allows the sintering of nanoparticles without their grain coarsening. Thus, in accordance with the present invention, by providing the proper surface termination of the starting nanoparticles and applying sintering temperatures of less than 0.7 Tm under external pressures, a fully dense solid that maintains the nanostructure of the original particles without grains coarsening can be produced.

FIG. 1 illustrates an exemplary process flow of the Enhanced High Pressure Sintering (EHPS) method for sintering nanoparticles to produce a fully dense monolithic material that maintains the nano-scaled microstructure of the original nanoparticles in accordance with the present invention. The method of the present invention includes several required steps, and it is essential to provide each step of the process as a necessary part, as well as all steps together to make the process sufficient.

Thus, in step 101 shown in FIG. 1, the starting material, i.e., nanoparticle powder is placed in an enclosure having a controlled temperature and a controlled atmosphere. In some embodiments, the starting material can consist of a single material with all particles having the same particle size or different particle size, while in other embodiments it can be a mixture of materials having the same or different particle sizes.

Once the powder is placed into the first enclosure, it is essential that it not be exposed to the ambient, i.e., the atmosphere surrounding the enclosure, at any time until the sintering process is complete and the fully dense, monolithic solid is produced. In some embodiments, different parts of the process can occur within different reaction chambers so long as the chambers are connected in such a way as to isolate the powder from the ambient as it travels from chamber to chamber. It will be noted, however, that the EHPS process in accordance with the present is not tied to any specific type of enclosures, p-ALD reactor, or high-pressure equipment, and any suitable such equipment may be used, so long as isolation of the powder from the ambient is maintained.

Thus, between steps 101 and 102, the powder is not exposed to the ambient at any time.

At step 102, the powder in the chamber is treated at a predetermined elevated temperature T1 and under the flow of a predetermined gas for a predetermined time t1, typically more than about 10 minutes, to remove contaminants and adsorbents such as $H_2O$, hydrocarbons, oxygen, etc., from the surface of the particles to produce particles having a pristine surface and the highest chemical potential. The temperature T1 of this cleaning treatment step 102 can be in the range of room temperature (RT) up to 2000° C. depending on the on the size, nature, and morphology of the particles. The gas for the treatment can be any suitable gas, depending on the nature of the particles, including but not limited to pure $H_2$, Ar, $N_2$, $CH_4$, $O_2$, and mixtures thereof.

Isolation of the powder from the ambient is maintained between steps 102 and 103.

At step 103 of the EHPS method in accordance with the present invention, the pristine treated powder is consolidated to a preformed, or "green," compact as a precursor to the sintering step. The "green" compact is formed at pressures and temperatures which are lower than actual sintering pressure and temperature, and typically has a density in the range of about 40-90% depending on the material, which allows the compact to retain its shape.

Finally, at step 104, the green compact is placed inside a high-pressure device and is sintered at a predetermined pressure P and a predetermined temperature T2 below 0.7 Tm for a predetermined time t2, typically greater than one second, to produce a monolithic solid having a density of not less than 99% (porosity of less than 1%). As with the case between steps 101/102 and 102/103, isolation of the green compact from the ambient is maintained between steps 103 and 104, e.g., by transferring the green compact by means of an air-tight conduit between chambers in the reaction vessel or using a sealed capsule. The applied pressures and temperatures can have any suitable values depending on the size, morphology, and nature of the constituent powders, with the applied pressure P being in the range of 2 bar-60,000 bar, typically greater than 100 bar, and the applied temperature T2 being, in the range of room temperature to about 2500° C., typically above 100° C. The applied pressure P and applied temperature T2 may be interrelated such that in some cases sintering at a higher pressure and lower temperature or at a lower pressure and a higher temperature may be provide sufficient sintering to produce a fully densified material while preventing grain coarsening.

After completion of step 104, the resulting monolithic body of the material can be exposed to the ambient or to the environment for which the material was made without compromising its designed properties.

In some embodiments, the process can include an optional step 102a between steps 102 and 103. In this embodiment, at step 102a, the nanopowder is placed into a powder Atomic Layer Deposition (p-ALD) reactor to make ALD core/shell or core/multi-shell particles of a desired configuration, using ALD techniques known in the art. As is the case with all other steps in the EHPS process in accordance with the present invention, isolation of the powder from the ambient is maintained between steps 102/102a and 102a/103, i.e., the powder is transferred to and from the p-ALD reactor without exposure to the ambient for any period of time.

In still other embodiments, the starting material placed into the reaction chamber at stop 101 can include core/shell or core/multi-shell particles of the same or different materials and sizes.

The new process in accordance with the present invention allows sintering of many different kinds of nanopowders having particle sizes of 50 nm or less to produce a fully dense bulk material that retains the nanostructure of the original particles and has a grain size comparable to that of the original nanoparticles. In addition, the EHPS process of the present invention can be used with powders having a particle size larger than 50 nm or with a mixture of powders having particle sizes both smaller and larger than 50 nm to produce a fully dense bulk material that retains the structure of the initial powders.

Thus, the new process in accordance with the present invention allows the production of a new class of fully dense bulk materials, known as three-dimensional (3D) monolithic nanostructures and nano-heterostructures. These materials are made by EHPS process using nanoparticles, core/shell or (and) core/multiple shell nanoparticles, which are strongly bond to each other during EHPS and at the same time retain the complex nanostructure of individual building blocks.

This new class of bulk materials have all the benefits of robust monolithic (i.e., fully dense) solids, but also have numerous other advantages.

For example, the physical, chemical, and mechanical properties of these materials are determined in large part by the size, structure, and properties of the constituent particles (nanoparticles or core/shell, multi-shell nanoparticles) and by the atypical big fraction of interfaces between particles inside the material, and therefore such properties can be engineered by appropriate selection of the sintering conditions and of the constituent size, structure, and properties.

In addition, the unique individual quantum confined properties of the nanoscale constituents (i.e., the "building blocks") of the material can be preserved while at the same time, strong covalent bonds between them create new collective electron and phonon behavior in the bulk so that desired band structure, phonon transport, electron carrier transport, electron pairing, exchange coupling, etc., can be engineered by appropriate selection of materials and sintering conditions.

Other desired properties of the bulk material for specific applications can be tailored and manipulated through the design of the building block nanostructure. For example core-shell nanopowders comprised of a $Y_2O_3$ core and MgO shell can be formed into a three-dimensional (3D) monolithic nano-heterostructure which can largely have the optical properties of $Y_2O_3$, but which can also have a continuous network of MgO which will provide high thermal conductivity. In other cases, core-shell nanopowders composed of a $HfB_2$ core and a hafnium oxide shell can be formed into a three-dimensional (3D) monolithic nano-heterostructure which largely has the mechanical properties of HfB2 and the oxidation resistance of hafnium oxide.

Thus, the new class of bulk materials produced by the method in accordance with the present invention creates a platform for development of novel devices for a wide spectrum of applications which require a new level and combination of physical, chemical, and mechanical properties in bulk materials. This new class of 3D materials has potential to deliver unprecedented performance in materials and devices including optics, lasers, magnetic, ferroelectrics, thermoelectric, ultra-high temperature materials, superconductors, etc.

The EHPS method of the present invention and materials produced thereby will now be described with respect to the following two Examples. It should be noted that the materials and reaction conditions described below are merely exemplary and do not in any way restrict or limit the scope of the invention described in the present disclosure.

Example I

In a first example, magnesium aluminate ($MgAl_2O_4$) nanopowder having a crystallite size of about 25 nanometers was placed in an alumina boat and heated to about 1000° C. in a furnace with flowing oxygen gas to remove impurities including moisture, carbonates, and hydrocarbons. The cleaned powder was then transferred to an enclosure containing a dry nitrogen environment, the transfer being effected without exposing the cleaned powder to the ambient atmosphere. The cleaned magnesium aluminate powder was compacted into a green compact with a relative density ranging from 40-60%. The green compact was then transferred to a high pressure device container; transfer was accomplished by sealing the green compact in a metal container so that it could be moved to the high-pressure device container without being exposed to the ambient atmosphere. The green compact was then sintered at an elevated pressure of about 20 kbar and an elevated temperature of about 800° C. for about 15 minutes to transform the green compact to a magnesium aluminate ceramic.

Figure 2:
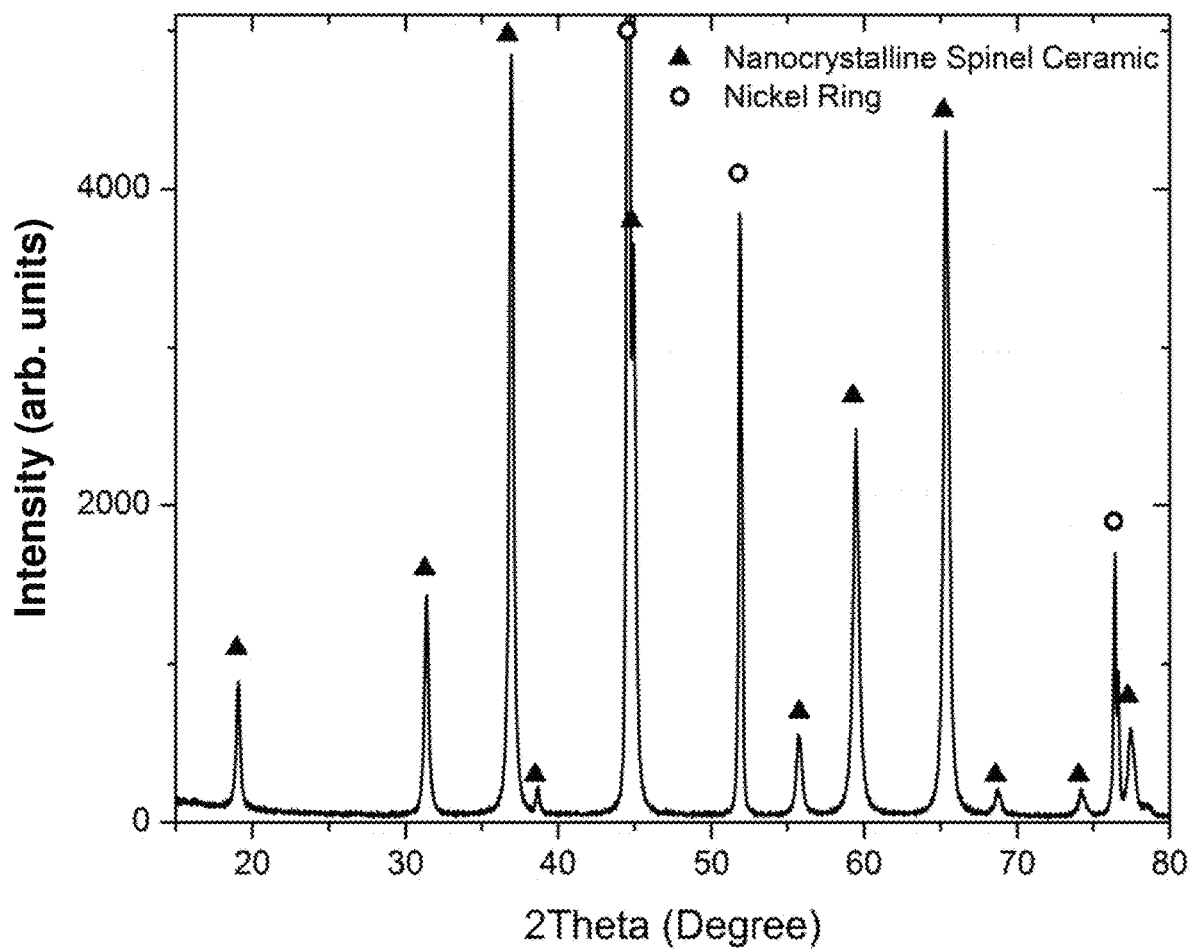
FIG. 2 is a plot depicting the results of X-ray diffraction analysis of a nanostructured magnesium aluminate ceramic produced in accordance with the method of the present invention.
Figure 3:
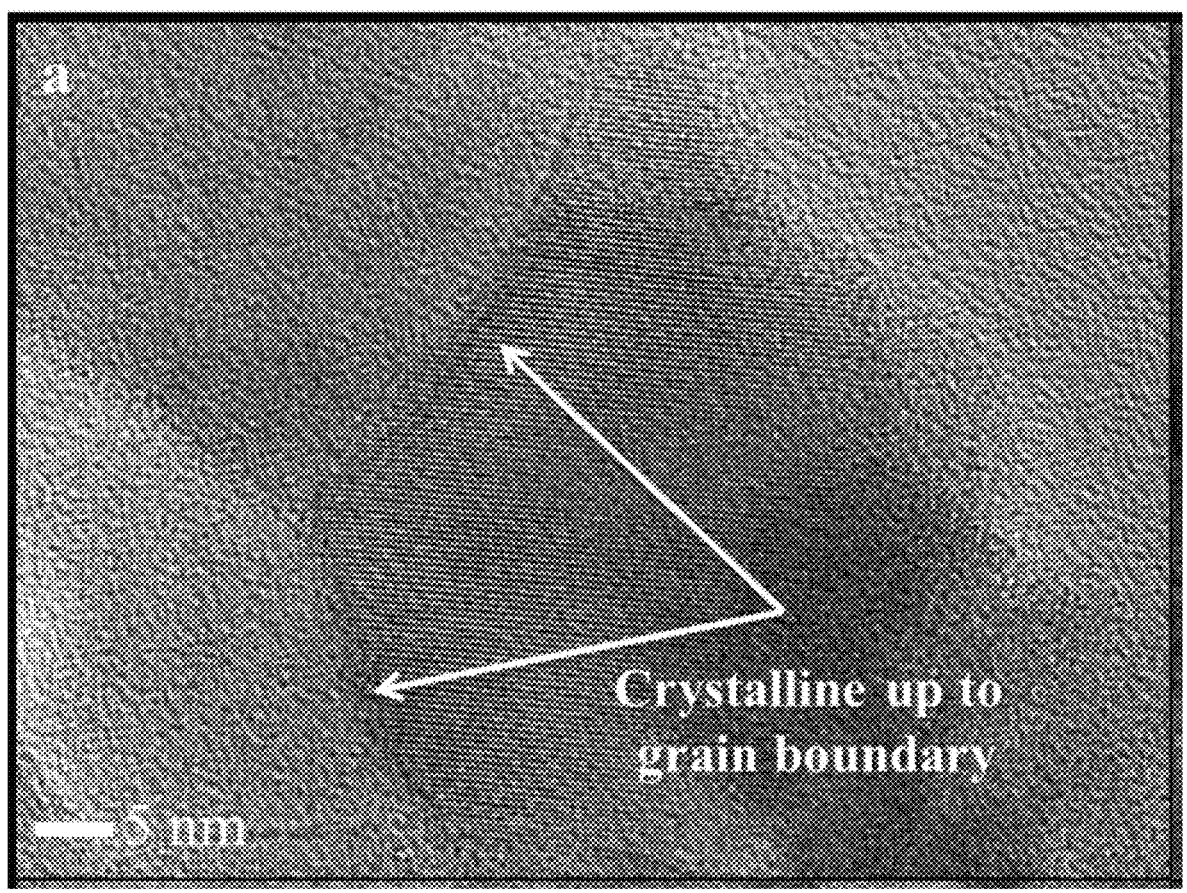
FIG. 3 is a transmission electron microscopy (TEM) image depicting a nanostructured magnesium aluminate ceramic produced in accordance with the method of the present invention.
Figure 4:
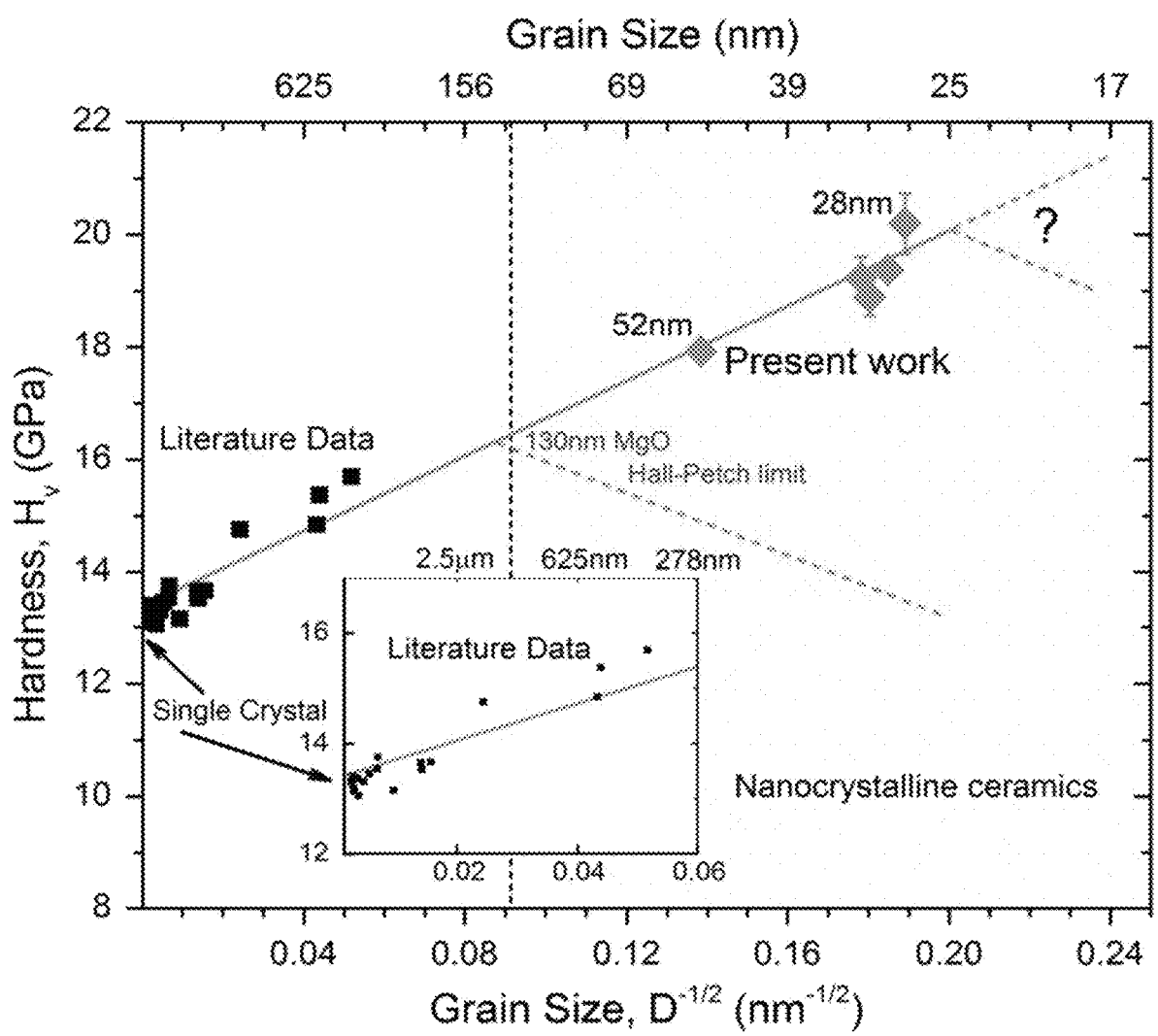
FIG. 4 is a plot illustrating the hardness of a nanostructured magnesium aluminate ceramic produced in accordance with the method of the present invention as compared to a magnesium aluminate ceramic having a larger grain size.

After completion of sintering step, temperature and the pressure in the high-pressure device container were lowered and the magnesium aluminate ceramic was recovered and evaluated. The relative density of the magnesium aluminate ceramic was 100%, as measured by a helium gas pycnometer. As can be seen from the plots in FIG. 2, X-ray diffraction analysis of the ceramic shows the broad intensity peaks typical of nanocrystalline material, plus additional intensity peaks for impurity phases. Using a Halder-Wagner type analysis of the X-ray diffraction peaks known in the art, the crystallite size of the ceramic was determined to be 28 nanometers. Transmission electron microscopy of the magnesium aluminate ceramic, shown in FIG. 3, illustrates that the grains are nanocrystalline and on the order of 25-30 nanometers. The hardness of the ceramic, as measured by microhardness indentation, was determined to be 20.2 GPa and, as shown in FIG. 4, was higher than the hardness measured for magnesium aluminate ceramic with a larger grain size.

Example II

In a second example, two metallic material samples were made, one having a preferred magnetic orientation of crystallites and one having a random orientation.

Both samples were prepared from a nanocrystalline iron (Fe) nanopowder having a crystallite size of about 25 nanometer mixed with samarium cobalt ($SmCo_5$) powder having a crystallite size of about 10 nanometers and a particle size of 2-10 micrometers. If a ferromagnetic material can be easily magnetized at low magnetic field, it is referred to as a "soft" magnetic material. On the other hand, if a ferromagnetic material is difficult to magnetize, but once magnetized, it is difficult to demagnetize, it is referred to as a "hard" magnetic material. Iron (Fe) is a soft magnetic material, while $SmCo_5$ is a hard magnetic material. In the metallic material samples made for this Example, the portion of Fe in the mixture is about 15 wt %.

To prepare the magnetically oriented sample, part of the powder mixture was separated and formed into a green compact in a high magnetic field to align the crystallites. The powder mixture and aligned green compact were then heated to about 200° C. in a furnace with flowing hydrogen gas to remove impurities including oxides, moisture, and hydrocarbons.

After cleaning, the powder and the aligned green compact were transferred, without exposing the powder or compact to the ambient atmosphere, to an enclosure containing a dry nitrogen environment, where the cleaned powder was compacted into a randomly aligned green compact with a relative density ranging of about 70%.

The randomly aligned and magnetically aligned green compacts were transferred to a high-pressure device container, with the transfer being made without exposing them to the ambient atmosphere, for example, by sealing the green compacts in a metal can which is then transferred to the high-pressure device container. The randomly aligned and magnetically aligned green compacts were then treated at an elevated pressure of about 45 kbar and an elevated temperature of about 400° C. for about 15 minutes to transform the green compacts into dense monolithic metallic parts.

Figure 5:
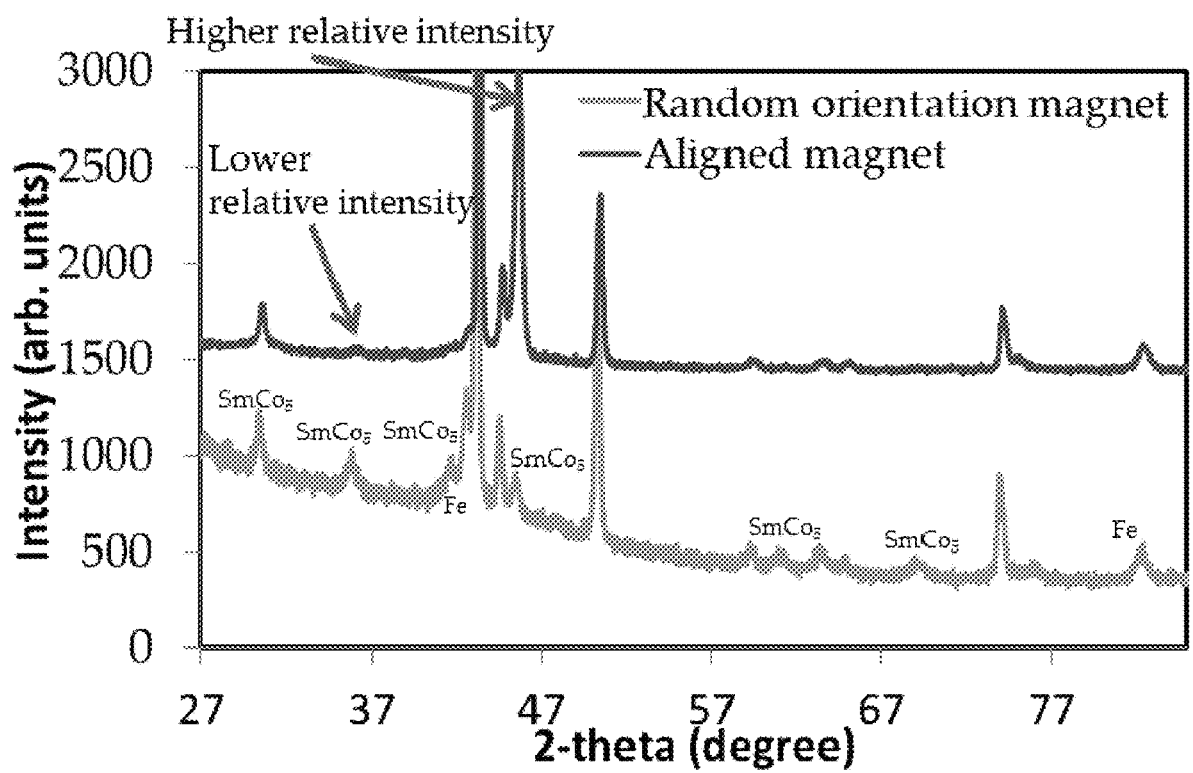
FIG. 5 contains plots showing the results of X-ray diffraction analysis of randomly oriented and magnetically aligned materials made from $SmCo_5$ powder and Fe nanoparticles in accordance with the method of the present invention.

After completion of the treatment at the elevated pressure and temperature conditions, the newly formed metallic parts were cooled and the pressure in the high-pressure device was lowered. The dense monolithic metallic parts were then recovered and evaluated. The relative density of the dense monolith metallic parts was measured by a helium gas pycnometer, and was found to be 100%. As shown in FIG. 5, X-ray diffraction of the randomly aligned and magnetically aligned dense monolith metallic parts shows broad Fe and $SmCo_5$ peaks, which are typical of nanocrystalline material and do not show any impurity phases. Comparison of the diffraction pattern of the magnetically aligned dense monolithic metallic material with the randomly aligned dense monolithic metallic material shows different peak intensities, which indicated a preferred orientation in the magnetically aligned sample.

Figure 6:
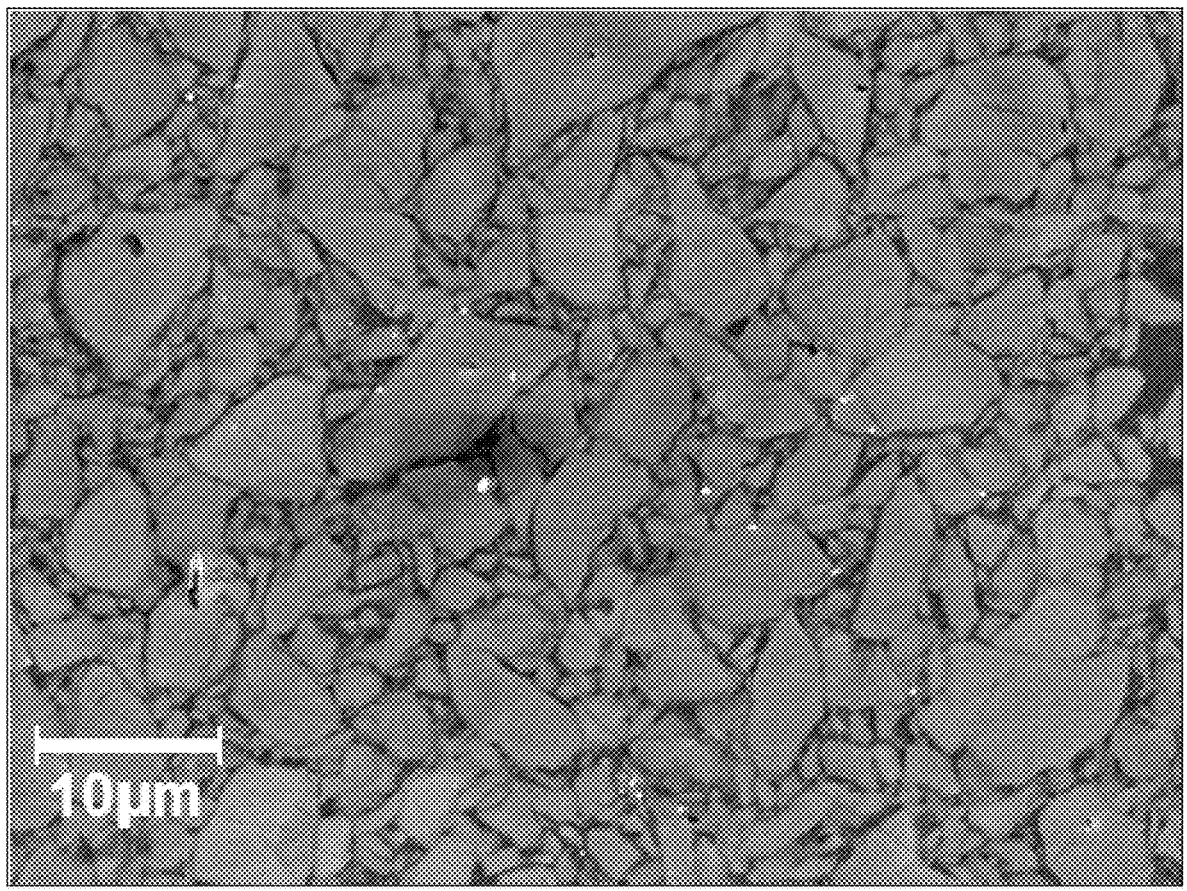
FIG. 6 is a scanning electron microscopy (SEM) image depicting a monolithic magnetic material formed from $SmCo_5$ powder and Fe nanoparticles in accordance with the method of the present invention.

Using a Halder-Wagner type analysis, the crystallite size of the Fe in the materials was determined to be about 25-30 nm while the crystallite size of the $SmCo_5$ was determined to be about 10 nm, both of which are approximately the crystallite size of the original Fe and $SmCo_5$ powders. As can be seen from the image in FIG. 6, scanning electron microscopy of the randomly aligned dense monolithic metallic material shows that the microstructure is dense and non-porous.

Figure 7A:
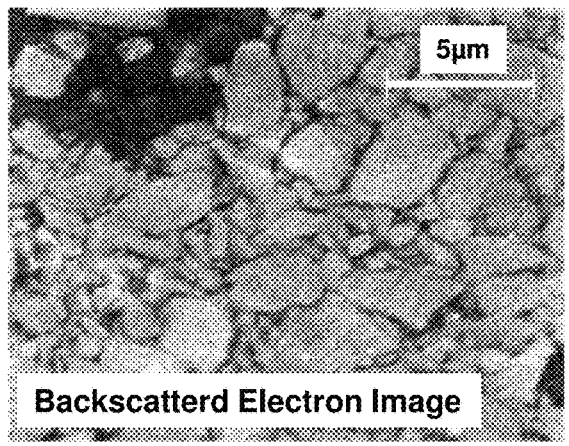
FIGS. 7A-7D are SEM Energy Dispersive X-ray Spectroscopy (EDS) images showing distribution of elements cobalt (Co), samarium (Sm) and iron (Fe) in magnetic materials formed from $SmCo_5$ powder and Fe nanoparticles in accordance with the method of the present invention.
Figure 7B:
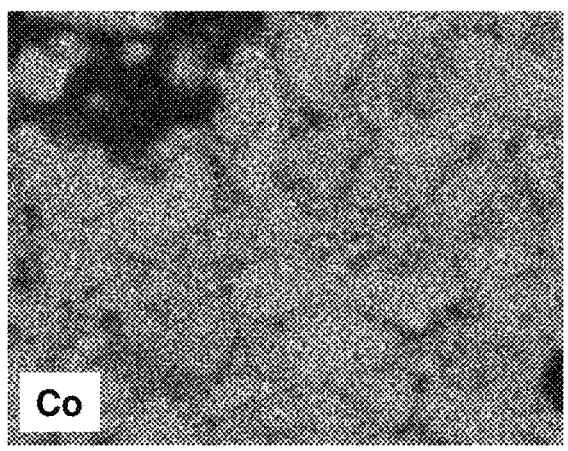
Figure 7C:
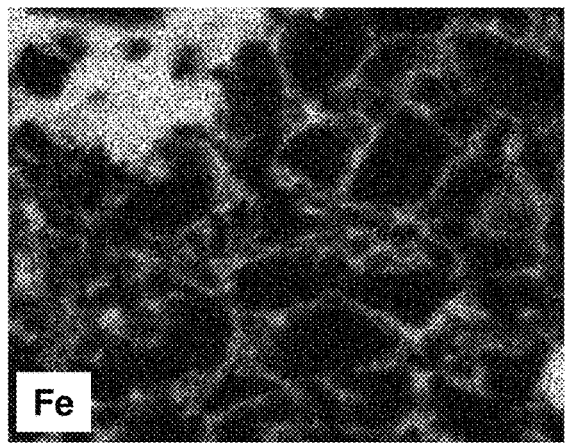
Figure 7D:
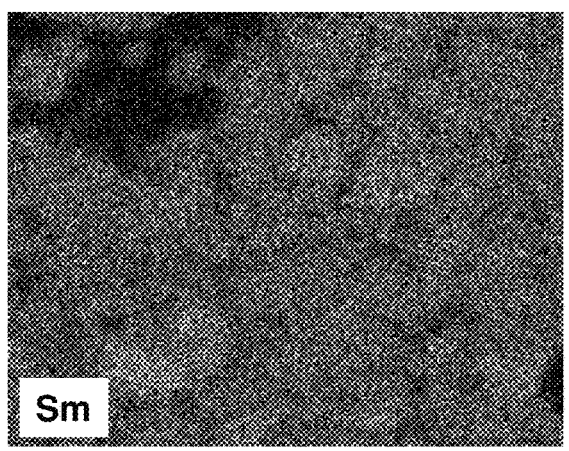

FIGS. 7A-7D are SEM Energy Dispersive X-ray Spectroscopy (EDS) images showing distribution of elements cobalt (Co), samarium (Sm) and iron (Fe) in the magnetic materials formed from $SmCo_5$ powder and Fe nanoparticles in accordance with the method of the present invention, where FIG. 7A shows a backscattered electron image of the Fe/$SmCo_5$ 3D monolithic nano-heterostructure magnet, FIG. 7B shows the location of cobalt in the microstructure, FIG. 7C shows the location of iron in the microstructure, and FIG. 7D shows the location of samarium in the microstructure. The images in FIGS. 7A-7D show that the Fe remains at the boundaries between the $SmCo_5$ powder particles and is not mixed or alloyed with the $SmCo_5$ phase.

Figure 8:
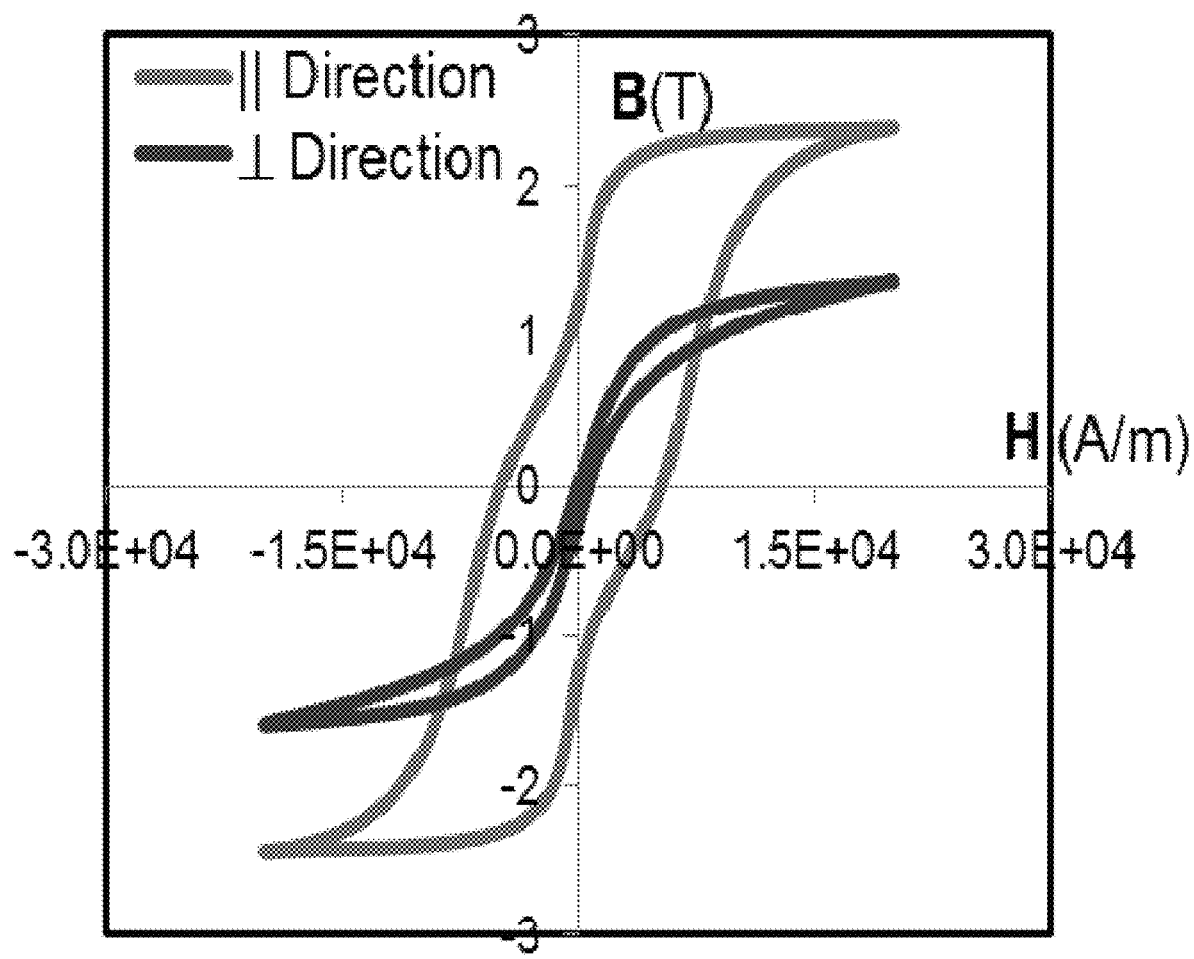
FIG. 8 is a plot showing anisotropy of magnetization along two orthogonal sample directions for a magnetic material formed from a $SmCo_5$ powder and Fe nanoparticles in accordance with the present invention.

Finally, the samples were analyzed using a vibrating sample magnetometer. The magnetic hysteresis loop produced as a result of that analysis is shown in FIG. 8, which shows that magnetization of the material is anisotropic along two orthogonal directions, one direction being perpendicular and the other being parallel to the original alignment enforced during green compaction. The magnetic material consists of magnetically aligned SmCo$_5$ powder and Fe nanoparticles formed in accordance with the method of the present invention.

As can be seen from FIG. 8, the loop for the magnetically oriented sample is different at orthogonal sample directions, which indicates that the material produced from the magnetically aligned green compact exhibits a preferred magnetic orientation. By using the method of the present invention as exemplified in this Example, a combination of hard and soft magnetic materials can be used to produce a strong magnet using readily obtainable materials and readily reproducible processing.

CONCLUSION

Materials exhibit unexpected atypical and often exceptional properties when scaled down to nanostructures. Cutting edge research strives to leverage the paradigms of nanoscale phenomena and capitalize on these unique properties by developing nano structures into bulk (3D) monolithic (fully dense) solids. The basic challenge is centered on how to produce designed bulk (3D) nanostructured materials with the required nano-scaled phases (including scales less than 50 nm) arranged in the designed order, which are at the same time fully dense without porosity and unwanted phases. The invention discloses a new process called Enhanced High Pressure Sintering (EHPS) to make from nanoparticles, as building blocks, Bulk Monolithic Nanostructured Materials by design which simultaneously meet all these requirements: preserve nanoscales of building blocks, preserve phases in a designed order, don't introduce unwanted phases, no porosity. The invention also discloses new materials which simultaneously meet all these requirements—Bulk Monolithic Nanostructures and Bulk Monolithic Nano Hetero structures.

Although particular embodiments, aspects, and features have been described and illustrated, one skilled in the art would readily appreciate that the invention described herein is not limited to only those embodiments, aspects, and features, and that modifications thereto may be made by persons skilled in the art. The present application contemplates any and all modifications within the spirit and scope of the underlying invention described and claimed herein, and all such combinations and embodiments are within the scope and spirit of the present disclosure.

What is claimed is:

1. A process for making a monolithic solid bulk nanostructured material from a nanoparticle powder, the solid bulk material retaining a nanostructure and a grain size of the nanoparticles in the powder, the process including the steps of:
   providing a powder comprising a plurality of nanoparticles of at least one predetermined nanoparticle material, the nanoparticles in the powder having a corresponding initial size and initial phase;
   placing the powder inside an enclosure having a controlled gas atmosphere;
   without exposing the powder to an ambient atmosphere, applying a predetermined temperature T1 to the powder inside the enclosure for a predetermined time t1 to clean the nanoparticles and provide a cleaned powder comprising nanoparticles having a surface free from surface contaminants or adsorbents;
   without exposing the cleaned powder to the ambient atmosphere and without adding any binder or sintering activator, making a preformed green compact from the cleaned powder; and
   without exposing the preformed green compact to the ambient atmosphere, applying a predetermined external pressure P and a predetermined temperature T2 less than 0.4 times the melting point of the nanoparticle material to the preformed green compact for a predetermined time t2 to sinter the powder into a monolithic solid bulk material having a density of at least 99% while preserving the phases of the nanoparticles in a designed order, without introducing any impurity phases or mixing of phases of the nanoparticles and without coarsening of the grains of the nanoparticle powder;
   wherein the monolithic solid bulk material retains the nanostructure and the grain size of the nanoparticles in the powder; and
   wherein the nanoparticle material, sintering pressure, and sintering temperature, and sintering time are configured to create at least one of a predetermined band structure, phonon transport, electron carrier transport, electron pairing, and exchange coupling in the solid bulk material.

2. The process according to claim 1, wherein the temperature T1 is greater than 100° C.

3. The process according to claim 1, wherein the time t1 is greater than 10 minutes.

4. The process according to claim 1, wherein the external pressure P is between 1 kbar and 20 kbar.

5. The process according to claim 1, wherein the external pressure P is between 2 bar and 1 kbar.

6. The process according to claim 1, wherein the temperature T2 is between 100° C. and 900° C.

7. The process according to claim 1, wherein the controlled gas atmosphere comprises $H_2$, Ar, $N_2$, $CH_4$, $O_2$, or mixtures thereof.

8. The process according to claim 1, wherein the nanoparticles comprise particles of a single material.

9. The process according to claim 1, wherein the nanoparticles comprise particles of a plurality of materials.

10. The process according to claim 1, wherein the nanoparticles include particles of at least one metal.

11. The process according to claim 1, wherein the nanoparticles include particles of at least one nonmetal.

12. The process according to claim 1, wherein the nanoparticles include particles of at least one insulator.

13. The process according to claim 1, wherein the nanoparticles comprise a mixture of metals and nonmetals.

14. The process according to claim 1, wherein the nanoparticles have a diameter of less than 50 nm.

15. The process according to claim 1, wherein a grain size of the monolithic solid bulk material is less than 50 nm.

16. The process according to claim 1, wherein the monolithic solid bulk material is an oxide ceramic.

17. The process according to claim 16, wherein the oxide ceramic is $MgAl_2O_4$ spinel.

18. The process according to claim 1, wherein the monolitihic solid bulk material is a nanocomposite magnet.

19. The process according to claim 1, wherein the monolithic solid bulk material is a thermoelectric material.

20. The process according to claim 1, wherein the nanoparticles include a plurality of core/shell or core/multi-shell nanoparticles.

* * * * *